United States Patent [19]

Kasatkin et al.

[11] 4,339,286

[45] Jul. 13, 1982

[54] CORE FLUX COMPOSITION FOR FLUX-CORED WIRES

[76] Inventors: Boris S. Kasatkin, ulitsa Anri Barbjusa, 22/24, kv. 111; Igor K. Pokhodnya, ulitsa Chkalova, 41-a, kv. 25; Valentin F. Musiachenko, ulitsa Saxaganskogo, 63, kv. 11; Vladimir N. Golovko, ulitsa Vladimirskaya, 9, kv. 29; Ljudmila N. Kolomiets, ulitsa Borschagovskaya, 189, kv. 45; Jury A. Simonenko, ulitsa Demiyana Korotchenko, 35, kv. 33, all of Kiev; Anatoly V. Gulyar, ulitsa Bakinskikh Komissarov, 17, kv. 10, Sverdlovsk, all of U.S.S.R.

[21] Appl. No.: 153,321

[22] Filed: May 27, 1980

[51] Int. Cl.³ .............................................. B23K 35/34
[52] U.S. Cl. ........................................ 148/24; 148/26
[58] Field of Search ................. 148/24, 26; 75/1 T, 75/53

[56] References Cited

U.S. PATENT DOCUMENTS

| | | | |
|---|---|---|---|
| 3,328,212 | 6/1967 | Coless | 148/26 |
| 3,428,427 | 2/1969 | Ralcevic | 75/1 TI |
| 3,490,942 | 1/1970 | Lalieu | 148/26 |
| 3,554,792 | 1/1971 | Johnson | 148/26 |
| 3,627,508 | 12/1971 | Hughes | 75/1 TI |
| 3,644,144 | 2/1972 | Timofee | 148/26 |
| 3,645,782 | 2/1972 | Johnson | 148/26 |
| 3,745,294 | 7/1973 | Arikawa | 148/26 |
| 3,935,414 | 1/1976 | Ballass | 148/24 |

*Primary Examiner*—P. D. Rosenberg
*Attorney, Agent, or Firm*—Fleit & Jacobson

[57] ABSTRACT

A core flux composition of a flux-cored wire for welding and surfacing high-strength steels with a gas-shielded process comprises the core flux ingredients taken in the following amounts, by weight %:

| | |
|---|---|
| rutile concentrate | 14.0–23.0 |
| fluorite concentrate | 7.0–12.0 |
| sodium fluosilicate | 2.0–6.0 |
| ferromanganese | 6.0–10.0 |
| ferrosilicon | 1.5–4.0 |
| ferromolibdenum | 1.0–2.5 |
| chromium (elemental) | 1.0–2.5 |
| nickel (elemental) | 4.0–9.0 |
| iron powder | 31.0–63.5 |

3 Claims, No Drawings

CORE FLUX COMPOSITION FOR FLUX-CORED WIRES

BACKGROUND OF THE INVENTION

1. Field of the Invention

The present invention relates to materials for arc welding, and in particular to flux composition for flux-cored wires for welding and surfacing high-strength alloyed steels with a gas-shielded process.

The invention may be used more efficiently in flux-cored wires designed for automatic and semiautomatic welding in normal, inclined and in horizontal position in a vertical plane.

2. The Prior Art

Known in the art are flux compositions for flux-cored wires which are used for welding and surfacing high-strength alloyed steels with $CO_2$-shielded process in all welding positions and which comprise a steel sheath filled with powdered flux forming a core thereof. There is also known a flux-cored wire having a flux core containing the following ingredients, by weight %:

| low-carbon ferrochromium | 18.7–75.0 |
| --- | --- |
| ferromolybdenum | 2.1–8.4 |
| manganese | 0.8–2.9 |
| ferrosilicon | 3.0–13.7 |
| iron powder | 69.0–0 |
| (cf. U.S. Pat. No. 3,253,120) | |

It is a common knowledge that during welding a great amount of hydrogen dissolves at molting temperature in the weld joint metal, which lowers the resistance thereof to cracks. As the weld seam produced by welding high-strength alloyed steels is liable to cracks the hydrogen content in the weld seam metal should be kept as low as possible. Since the flux-cored wire having a core formed from the above flux composition does not prevent hydrogen from its dissolving in the weld metal the hydrogen content therein is considerable. In addition, the weld seams produced with the use of this flux-cored wire have a bead shape which lowers their fatigue strength.

The best results in welding and surfacing high-strength alloyed steels have been obtained with the use of a flux-cored wire having a core flux composed of the following ingradients, by weight %:

| calcium fluoride | 5–25 |
| --- | --- |
| magnesium oxide | 5–15 |
| silicon dioxide | 0–25 |
| ferrosilicon | 5–10 |
| ferromanganese | 2–5 |
| ferrochromium | 0–5 |
| ferromolybdenum | 0–20 |
| nickel | 0–20 |
| alluminium magnesium powder | 0–15 |
| (cf. U.S. Pat. No. 3,424,892) | |

The weld seam produced with the use of a wire having the above core flux composition features high mechanical properties. Calcium fluoride contained in the above flux composition prevents the formation on the weld seam surface of the oxide film of the high melting-point oxides, and to some extent binds hydrogen dissolving in the weld metal, in the course of welding, to form volatile fluorides, thereby lowering hydrogen content in the weld metal. However, in the process of welding with the above flux-cored wires there takes place intensive spattering of the electrode metal, which is due to the fact that calcium fluoride contained in the above flux composition is known to be an active destabilizer of the arc.

In addition, weld seams produced with the use of flux-cored wires having the above core flux composition are of a bead shape and have coarse ripples, which lowers their fatigue strength. To remedy this disadvantage the resulting weld seam has to be machined, which is associated with additional labour consumption. It should be also noted that the weld seam thus obtained contains from 0.040 to 0.045 weight percent oxygen, and hydrogen inspite of the fact that the latter is partially bound by calcium fluoride at a rate of 4–5 $cm^3$ per 100 g of the weld metal. Such content of gases in the weld metal lowers resistance thereof to cold cracks and its impact strength at temperatures both below and above zero.

The principal object of the invention is to provide a flux composition of flux-cored wires for welding and surfacing high-strength alloyed steels, which would improve welding properties of flux-cored wires.

Another object of the invention is to impart high mechanical properties to the weld seam metal.

Still another object of the invention is to lower oxygen and hydrogen content in the weld seam metal.

Yet another object of the invention is to improve notch impact strength of the weld seam metal at temperatures both above and below zero.

A further object of the invention is to enhance resistance of the weld seam metal both to cold and hot cracks.

Other objects and advantages of the present invention will be apparent from the specification given below.

SUMMARY OF THE INVENTION

These and other object of the invention are accomplished by that a flux composition of flux-cored wire for welding and surfacing steels with a gas-shielded process, containing calcium fluoride, ferrosilicon, ferromanganese, elemental chromium, ferromolybdenum and elemental nickel, according to the invention further includes rutile concentrate, sodium fluosilicate, and iron powder with all the above ingredients being taken in the following amounts, by weight percent:

| rutile concentrate | 14.0–23.0 |
| --- | --- |
| fluoride concentrate | 7.0–12.0 |
| sodium fluosilicate | 2.0–6.0 |
| ferromanganese | 6.0–10.0 |
| ferrosilicon | 1.5–4.0 |
| ferromolybdenum (elemental) | 1.0–2.5 |
| chromium (elemental) | 1.0–2.5 |
| nickel | 4.0–9.0 |
| iron powder | 31.0–68.5 |

The flux-cored wires having the proposed core flux composition permits forming weld seams in normal, inclined and horizontal positions in a vertical plane, with the amount of spattering electrode metal constituting from 4 to 6% by weight. The resultant weld seams have a smooth surface and even transition to the basic metal, i.e. metal being welded. The resultant weld metal is well deoxidized and contains 0.020–0.080 weight percent oxygen, and small amount of hydrogen from 0.8 to 1.5 $cm^3$ per 100 g of weld deposit. It should be also noted that the weld seam metal features high resistance to cold and hot cracks and a high notch impact strength at low temperatures.

The presence in the proposed core flux composition of rutile concentrate in said amounts provides for stable arcing and proper formation of the weld seam. The resultant seam has a smooth surface and a gradient transition to the basic metal.

Decreasing the rutile concentrate content below the said lower limit increases the convexity of the seam and results in more intensive spattering of the electrode metal. At the same time increasing the rutile concentrate content in the proposed flux composition above the said upper limit results in poor welding properties of the slag: its gas permeability becomes lower, and the range of its crystallization gets smaller, which affects the formation of the weld seam.

Introduction into the proposed flux composition of sodium fluosilicate in the said amounts makes it possible to bring down the hydrogen content in the weld seam metal to 0.8–1.5 cm$^3$ per 100 g of the weld deposit. Decreasing its content below the said lower limit results in the increased hydrogen content in the weld metal, whereas the hydrogen content exceeding the said upper limits leads to intensive spattering of the electrode metal.

The presence in the proposed composition of alloying elements, such as ferromolybdenum, nickel and chromium improves mechanical properties of the weld seam metal with respect to the yielding, tensile strength and notch impact strength thereof at temperatures above and below zero. The resistance of the weld metal to cold cracks is also improved as a result.

Introducing the above alloying elements in amounts below the said lower limit impairs mechanical properties of the resultant weld seam, such as yielding and tensile strength.

Decreasing the ferromolybdenum and nickel content in the proposed core flux composition below the said lower limit results in a lower notch impact strength of the weld seam metal produced with the use of the flux-cored wire having the proposed core flux composition, at temperatures below zero. The ferromolybdenum and nickel content in the proposed flux composition exceeding the said upper limit affect the plasticity (specific elongation and impact strength) of the weld seam metal produced with the use of the flux-cored wire having a core formed from the proposed core flux composition. Increasing the content of chromium in the proposed core flux composition results in lower resistance of the weld seam metal to cold cracks.

DETAILED DESCRIPTION OF THE INVENTION

The invention will now be explained with reference to embodiments thereof.

EXAMPLE 1

Welding high-strength steel test pieces was done with the use of 2.2 mm flux-cored wires (designated as A, B and C) having a core formed from the flux composition of the invention. A steel sheath of each wire constituted 70% by weight of the electrode wire used and contained the following ingredients; in wgt %, carbon—0.05, manganese—0.20, silicon—0.12, sulphur—0.020, phosphorus—0.020.

Welding was carried out in a normal position with a semi-automatic process using 350 amp welding direct current of reversed polarity, and welding arc voltage of 27 V.

Carbon dioxide was used as a shielding gas.

The steel in the test pieces 20 mm thick contained 0.12% of carbon, 1.1% of manganese, 0.25% of silicon, 1.5% of chromium, 0.2% of nickel, 0.50% of molibdenum, 0.004% of boron.

The core flux composition used contained the following ingredients, in weight %:

TABLE 1

| Core flux ingredients | Flux-cored wire | | |
|---|---|---|---|
| | A | B | C |
| 1 | 2 | 3 | 4 |
| Rutile concentrate | 14.0 | 20.0 | 23.0 |
| Fluorite concentrate | 7.0 | 10.3 | 12.0 |
| Sodium fluosilicate | 2.0 | 4.0 | 6.0 |
| Ferromanganese | 6.0 | 9.0 | 10.0 |
| Ferrosilicon | 1.5 | 2.8 | 4.0 |
| Ferromolybdenum | 1.0 | 1.8 | 2.5 |
| Chromium | 1.0 | 1.8 | 2.5 |
| Nickel | 4.0 | 7.0 | 9.0 |
| Iron powder | 63.5 | 43.3 | 31.0 |

Metal of the weld seams formed with the use of the flux-cored wires having a core made from the above core flux compositions was tested for notch impact strength, specific elongation, tensile strength, and was subjected to physicochemical analysis to determine the content of oxygen, nitrogen, and hydrogen in the weld metal.

Mechanical tests were conducted by applying conventional methods.

Oxygen, nitrogen and residual hydrogen content was determined by conventional vacuum melting method, whereas the diffusive hydrogen content was found by the international standard ISO 3690.

The comparative results of mechanical tests and chemical analysis given in tables 2 and 3 illustrate advantages of the flux-cored wires having a core formed from the proposed flux composition over the prior art flux-cored wire (U.S. Pat. No. 3,424,892).

TABLE 2

| Flux-cored wire | Yield point, kg/mm$^2$ | Tensile strength, kg/mm$^2$ | Specific elong. % | Notch impact strength, kgpm/cm$^2$ (Mesnager notch test) | | |
|---|---|---|---|---|---|---|
| | | | | +20 | −40° C. | −50° C. |
| 1 | 2 | 3 | 4 | 5 | 6 | 7 |
| A | 65.1 | 77.0 | 18.1 | 10.8 | 8.3 | 6.0 |
| B | 68.4 | 81.0 | 20.0 | 13.7 | 12.2 | 9.0 |
| C | 84.5 | 73.4 | 19.0 | 12.7 | 11.0 | 7.6 |
| Prior art (U.S. Pat. No. 3,424,892) | 91.2 | 94.5 | 16.0 | 8.2 | 4.0 | 3.5 |

TABLE 3

| Flux-cored wire | Gas content, wgt % | | Hydrogen content, cm$^3$/100 g | |
|---|---|---|---|---|
| | Oxygen | Nitrogen | diffusive | total (diffusive and residual) |
| 1 | 2 | 3 | 4 | 5 |
| A | 0.030 | 0.015 | 0.8 | 1.5 |
| B | 0.025 | 0.010 | 0.6 | 0.8 |
| C | 0.029 | 0.012 | 0.9 | 1.3 |
| Prior art, (U.S. Pat. | | | | |

TABLE 3-continued

| Flux-cored wire 1 | Gas content, wgt % | | Hydrogen content, cm³/100 g | |
|---|---|---|---|---|
| | Oxygen 2 | Nitrogen 3 | diffusive 4 | total (diffusive and residual) 5 |
| No. 3,424,892 | 0.045 | 0.015 | 2.0 | 4.0 |

As can be seen from the above tabulated test results the weld seams produced with the use of the flux-cored wires having a core made from the core flux composition of the invention feature higher impact strength, especially at temperatures below zero, and lower gas content, and in particular a low hydrogen content.

In addition, the flux-cored wires having the core flux composition of the invention provide for a proper formation of the weld seams: concave shape with a gradient transition to the basic metal, easy-to-remove slag film, high resistance to hot cracks, and low intensity of the electrode metal spattering.

EXAMPLE 2

(negative)

Welding steel test pieces was done, in general, in the same manner as in Example 1, for except that the ingredients of the core flux composition were taken in amounts which were below the lower limit indicated in the appended claims.

The above core flux composition contained the following ingredients, by weight %:

| Rutile concentrate | 12.8 |
|---|---|
| Fluorite concentrate | 6.8 |
| Sodium fluosilicate | 1.8 |
| Ferromanganese | 5.8 |
| Ferrosilicon | 1.4 |
| Ferromolybdenum | 0.8 |
| chromium | 0.8 |
| Nickel | 3.8 |
| Iron powder | 66.0 |

Below are given results of the mechanical tests and phisicochemical analysis of the weld seam metal:

| Yield point, kg/mm² | 60.0 |
|---|---|
| Tensile strength, kg/mm² | 72.0 |
| Specific elongation, % | 14.0 |
| Notch impact strength (Mesnager notch test), kgmp/cm²: | |
| +20 C. | — |
| −40° C. | 1.5 |
| −50° C. | — |
| Oxygen content, wgt. % | 0.05 |
| Nitrogen content, wgt. % | 0.018 |
| Residul hydrogen, cm³/100 g | 2.5 |
| Total diffusive and residual hydrogen, cm³/100 g | 4.5 |

The weld seam produced by using the flux-cored wire having the above core flux composition features lower mechanical properties and higher content of gases, increased liability to pores and cracks, and more intensive spattering of the electrode metal.

EXAMPLE 3

(negative)

Welding steel test pieces was done, in general, in the same manner as in Example 1, for except that the ingredients of the core flux composition were taken in amounts which were above the upper limit indicated in the appended claims.

The above core flux composition contained the following ingredients, weight %:

| Rutile concentrate | 23.5 |
|---|---|
| Fluorite concentrate | 12.2 |
| Sodium fluosilicate | 6.2 |
| Ferromanganese | 10.2 |
| Ferrosilicon | 4.2 |
| Ferromolybdenum | 2.7 |
| chromium | 2.6 |
| Nickel | 9.2 |
| Iron powder | 29.2 |

Given below are results of mechanical tests and physicochemical analysis of the weld metal:

| Yield point, kg/mm² | 68.0 |
|---|---|
| Tensile strength, kg/mm² | 80.0 |
| Specific elongation | 13.0 |
| Notch impact strength (Mesnager notch test), kgpm/cm²: | |
| +20° C. | 7.5 |
| −40° C. | 2.0 |
| −50° C. | — |
| Oxygen content, wgt. % | 0.050 |
| Nitrogen content, wgt. % | 0.016 |
| Residual hydrogen content, cm³/100 g | 2.5 |
| Total residual and diffusive hydrogen, cm³/100 g | 4.5 |

The above mechanical tests and physicochemical analysis show that the weld seam produced with the use of the flux-cored wire having a core made from the above core flux composition has lower plasticity (specific elongation and impact strength) and a higher content of gases. Further, in the course of welding there were observed more intensive spattering of the electrode metal, and the weld seams had coarse ripples and bead form.

While particular embodiments of the invention have been shown and described, various modifications thereof will be apparent to those skilled in the art and therefore it is not intended that the invention be limited to the disclosed embodiments and the departures may be made therefrom within the spirit and scope of the invention as defined in the claims.

We claim:

1. Core flux composition of a flux-cored wire for welding and surfacing high-strength steels with a gas-shielded process, containing the core flux ingredients in the following amounts, by weight %:

| rutile concentrate | 14.0–23.0 |
|---|---|
| fluorite concentrate | 7.0–12.0 |
| sodium fluosilicate | 2.0–6.0 |
| ferromanganese | 6.0–10.0 |
| ferrosilicon | 1.5–4.0 |
| ferromolybdenum | 1.0–2.5 |
| chromium (elemental) | 1.0–2.5 |
| nickel (elemental) | 4.0–9.0 |
| iron powder | 31.0–63.5 |

2. The invention as recited in claim 1, wherein said core flux composition is located within a steel sheath.

3. A flux-cored wire for welding and surfacing high-strength steels with a gas-shielded process, wherein the core flux comprises the following ingredients, by weight %:

| | |
|---|---|
| rutile concentrate | 14.0–23.0 |
| fluorite concentrate | 7.0–12.0 |
| sodium fluosilicate | 2.0–6.0 |

-continued

| | |
|---|---|
| ferromanganese | 6.0–10.0 |
| ferrosilicon | 1.5–4.0 |
| ferromolybdenum | 1.0–2.5 |
| chromium (elemental) | 1.0–2.5 |
| nickel (elemental) | 4.0–9.0 |
| iron powder | 31.0–63.5 |

* * * * *